Nov. 30, 1954  S. R. JOHNSON  2,695,582
COLLAR SEPARATING MACHINE
Filed June 19, 1950  10 Sheets-Sheet 1
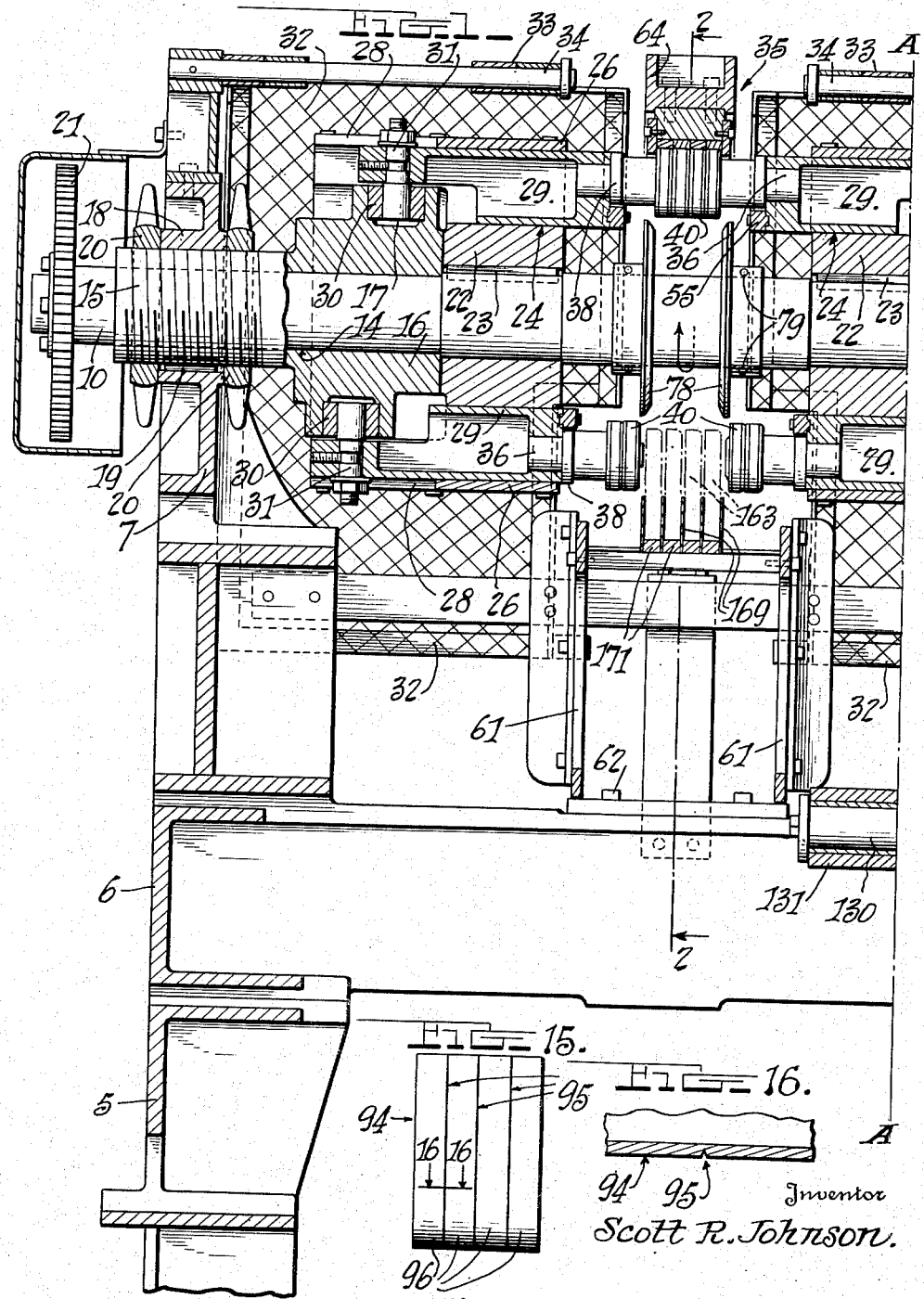
Inventor
Scott R. Johnson.
By Mason, Porter, Diller & Stewart
Attorney

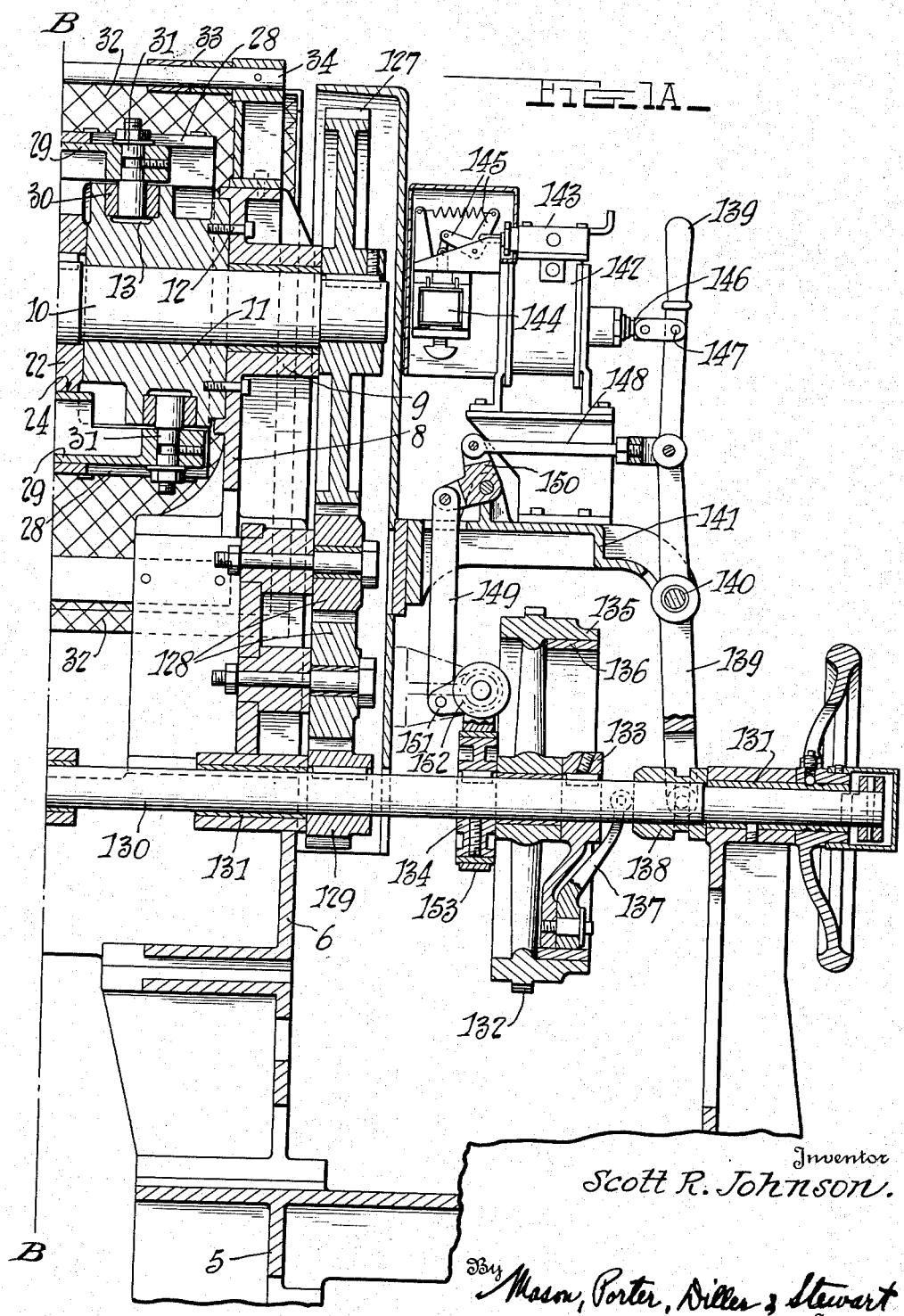

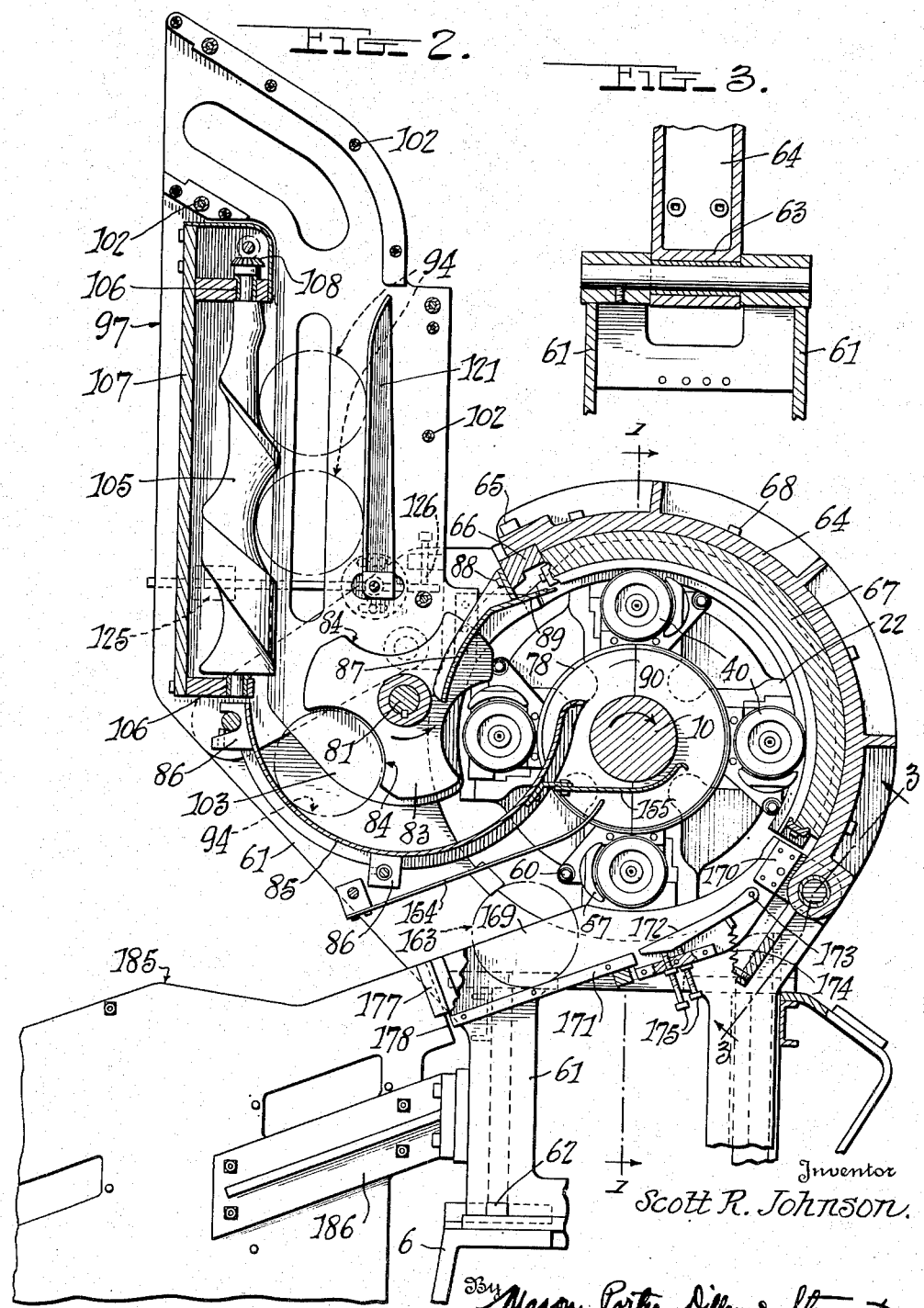

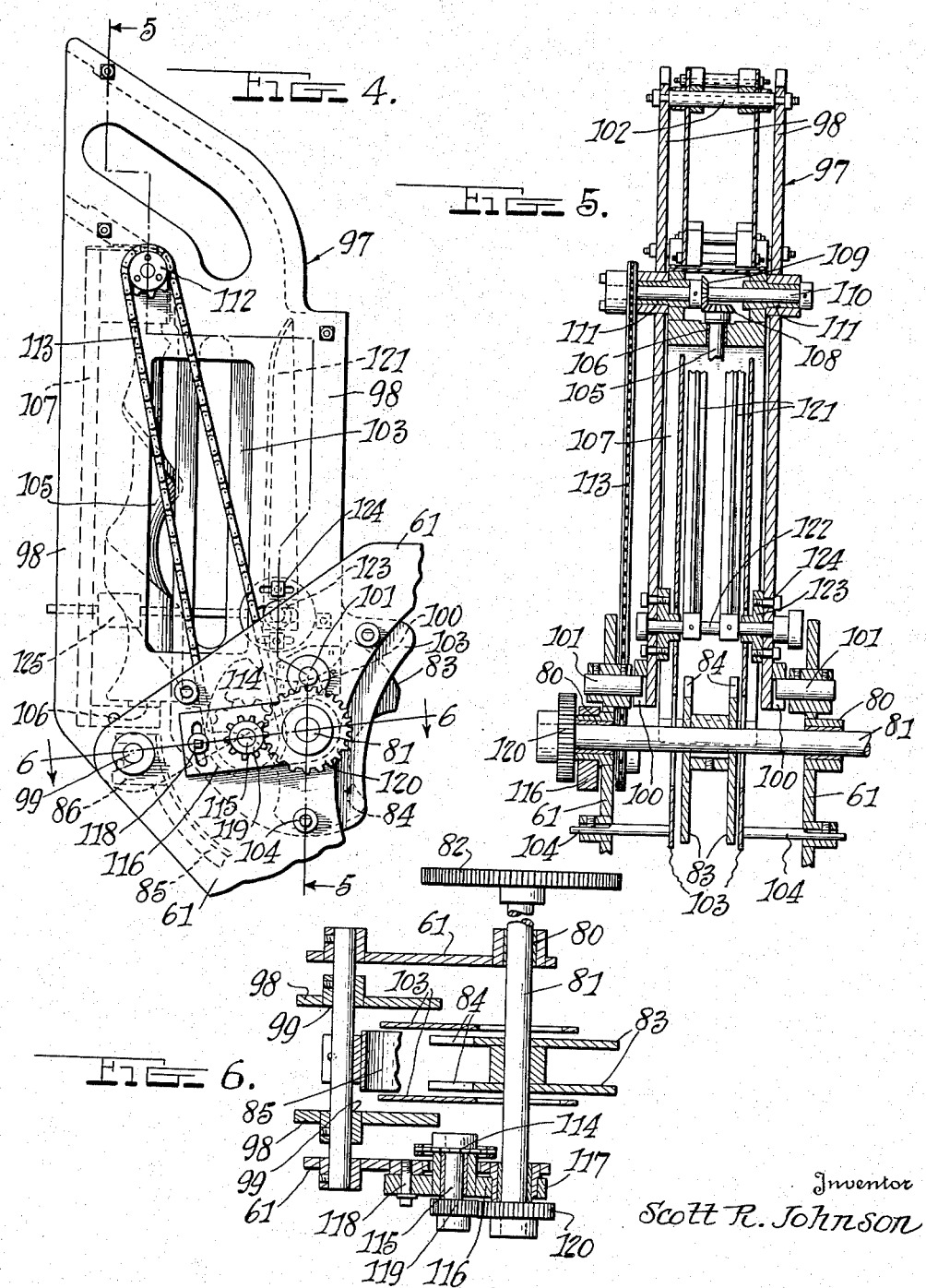

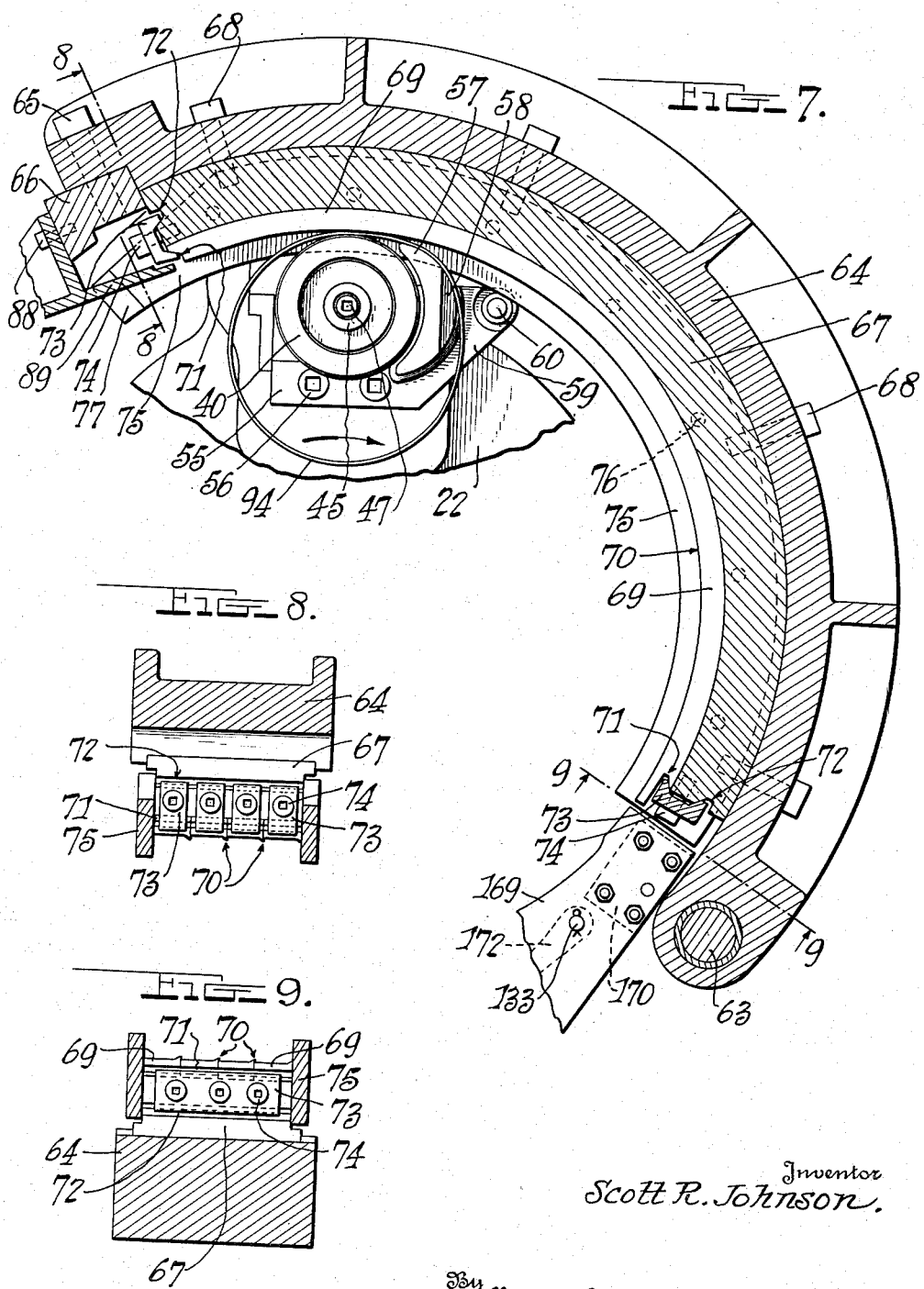

Nov. 30, 1954

S. R. JOHNSON 2,695,582

COLLAR SEPARATING MACHINE

Filed June 19, 1950

Inventor
Scott R. Johnson

By Mason, Porter, Diller & Stewart
Attorney

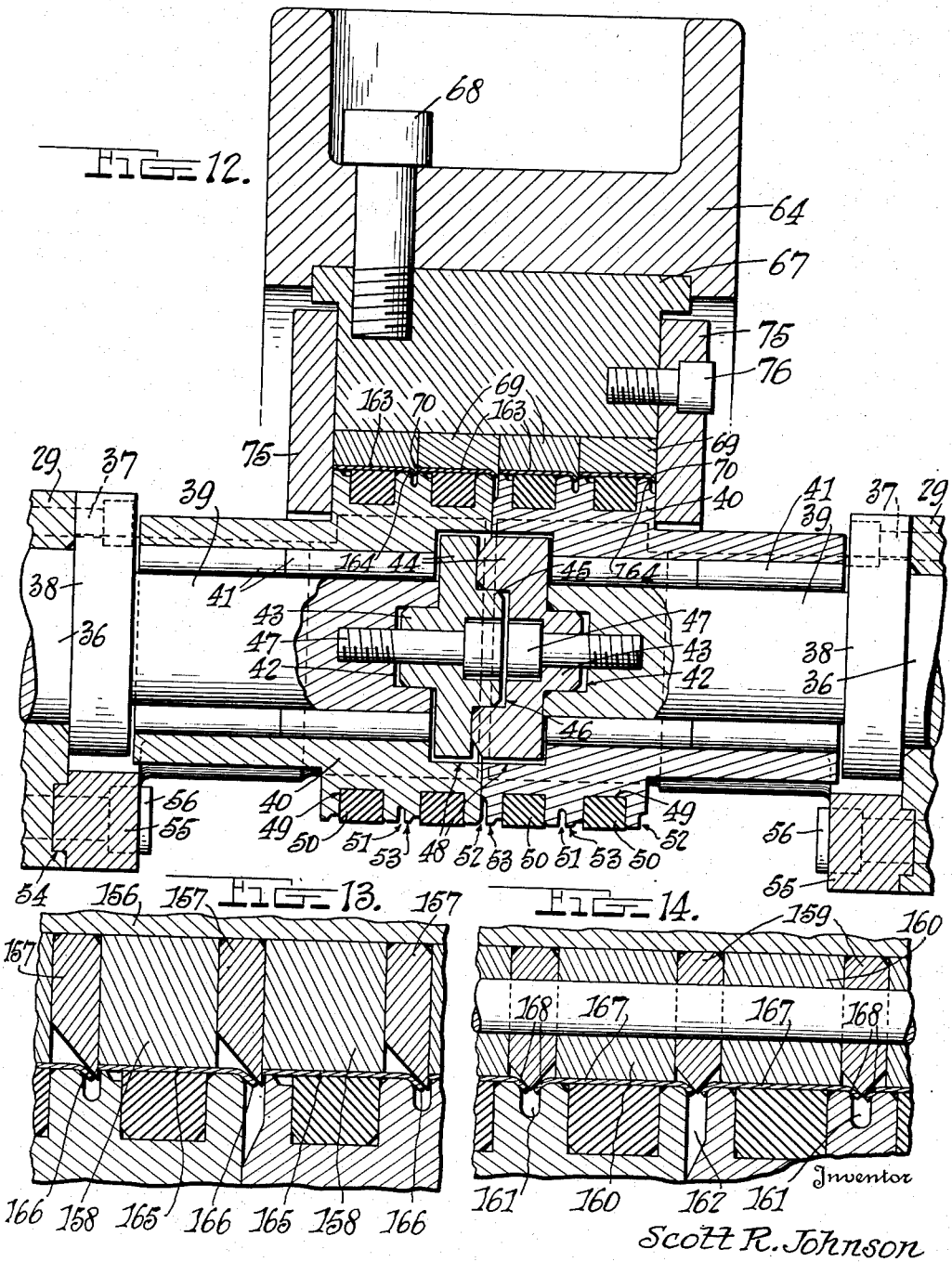

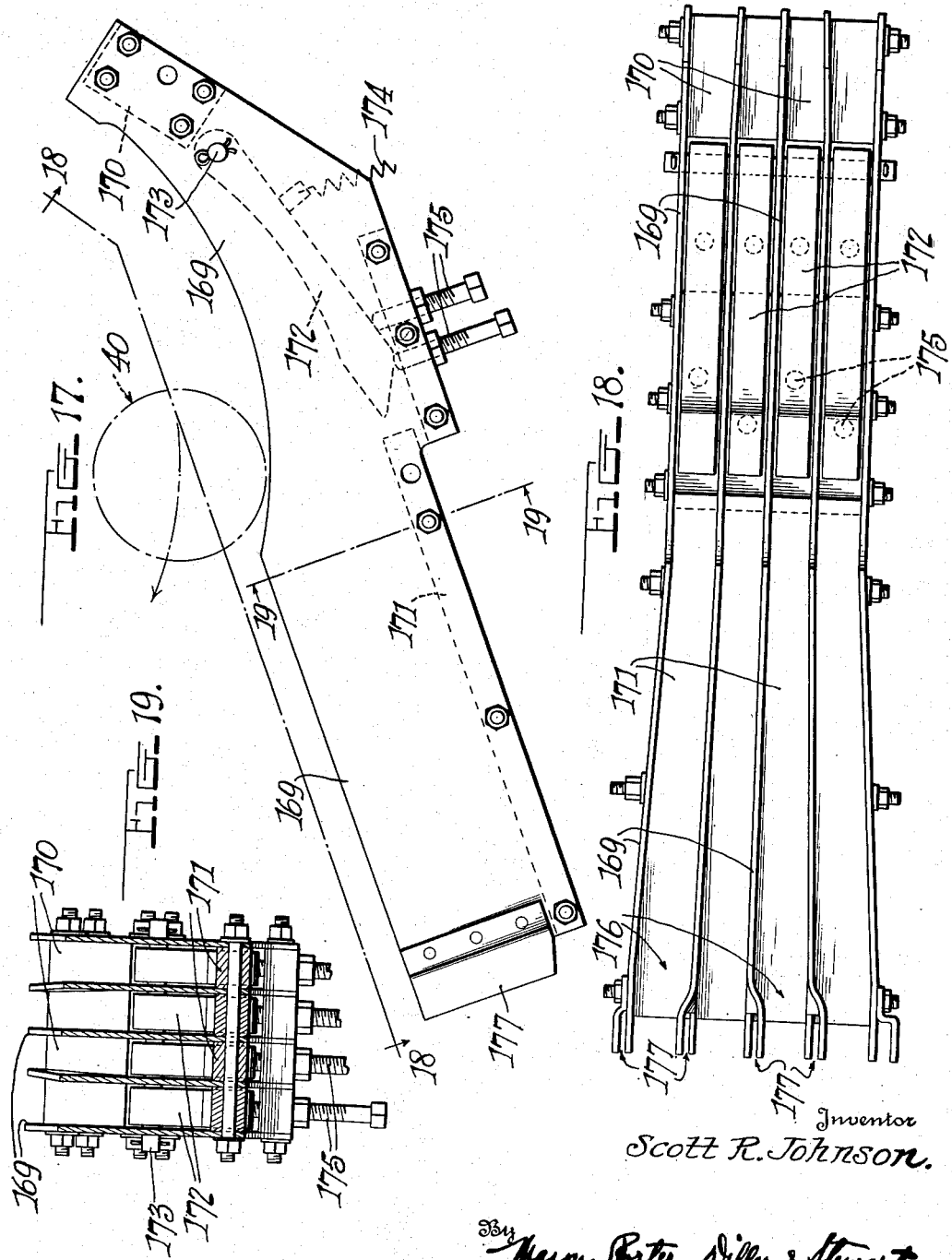

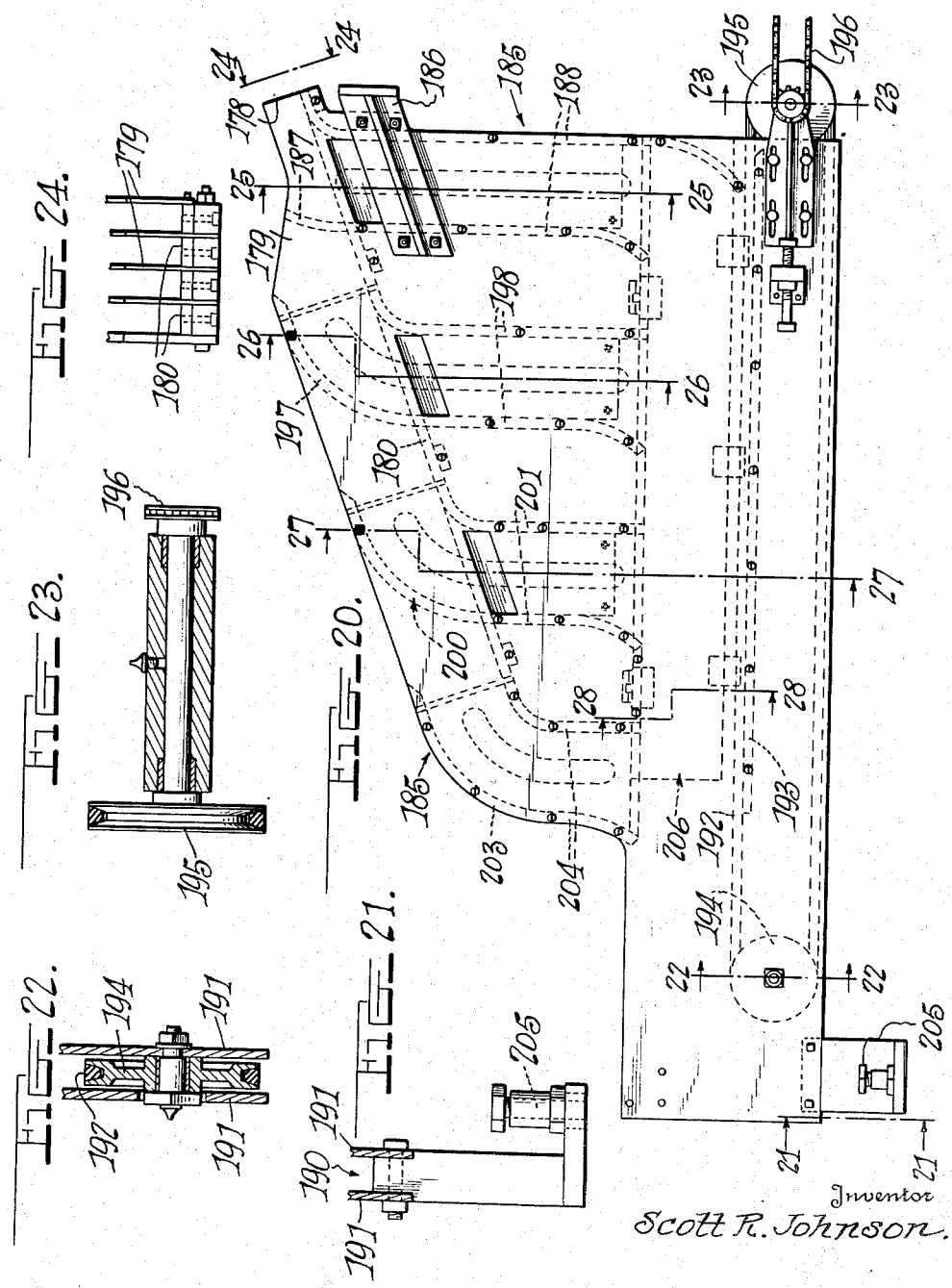

Nov. 30, 1954  S. R. JOHNSON  2,695,582
COLLAR SEPARATING MACHINE
Filed June 19, 1950  10 Sheets-Sheet 10
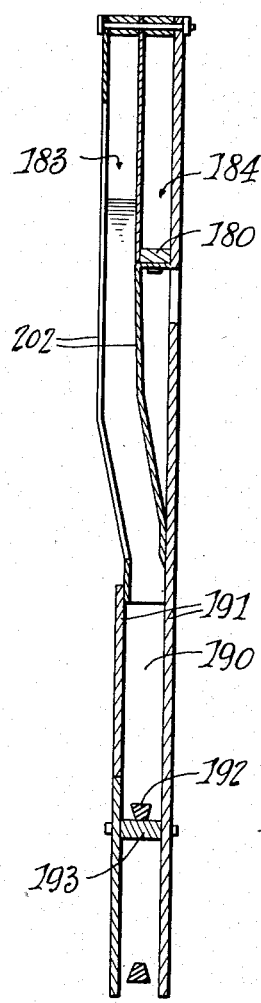
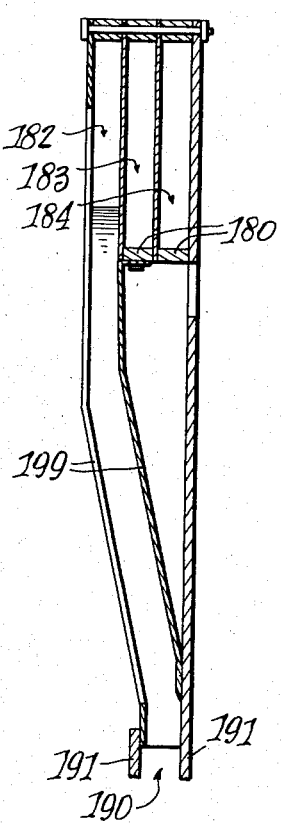
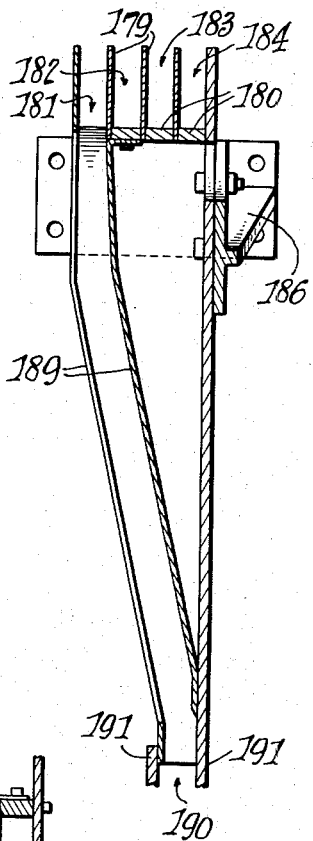
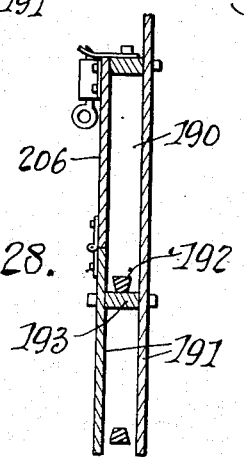
Inventor
Scott R. Johnson
By Marsh, Porter, Diller & Stewart
Attorney

United States Patent Office

2,695,582
Patented Nov. 30, 1954

2,695,582
COLLAR SEPARATING MACHINE

Scott R. Johnson, River Forest, Ill., assignor to Continental Can Company, Inc., New York, N. Y., a corporation of New York Application June 19, 1950, Serial No. 168,942

26 Claims. (Cl. 113—1)

The invention relates generally to the art of forming collar can collars or comparable ring-like bodies and primarily seeks to provide a novel machine structure in which to rapidly and accurately separate metal sleeves comprising a multiple of score line defined collars or ring-like bodies into the multiple of collars or bodies defined by said lines.

Collar cans are well known, and in them each can body is provided with a tear strip adjacent the upper end which can be wound about a key and thus torn from the body to separate the upper extremity of the can body and the attached top end closure from the main body of the can, thereby to effect an opening of the can. It is customary to provide a collar within and extending from the upper extremity of the can body left by the tearing out of the tear strip so as to provide an upward extension over which the skirt depending from the removed top closure of the can can be telescoped in order to effect a reclosure of the can. Some collars have been made up from seamless tubing, and others have been made up from flat blanks, the ends of the blanks being brought together in the form of a seam. Similar practices have been followed in the formation of other ring-like bodies, for example, in the formation of shallow can bodies. Such collars or bodies have been difficult to handle when formed individually, and it has been practically impossible to form them by generally accepted body maker practices because of the difficulties experienced in handling the narrow ring-like elements and the tendency of said bodies to cock and bind on the horn. Accordingly, it has been proposed to form metal sleeves of multiple collar or other ring-like body length, and then to separate each sleeve into its complement of individual collars or ring-like bodies. When this sleeve separating step is attempted by shear cutting on parallel circumferential lines, great difficulty has been experienced in causing the start and finish of each shear cut to meet because of the tendency of the shearing cutters to run off the line. For this reason, and also for reasons of improving accuracy and rapidity of operation, it has been proposed to define the individual collar or ring-like body widths by deep score lines placed in parallel relation along each sleeve, and to simultaneously rupture all such score lines by rolling contact with rupturing ribs. It is a purpose of the present invention to provide a novel machine structure in which to receive the scored sleeves, simultaneously rupture the score lines of each sleeve to thereby separate each sleeve into its complement of individual collars or ring-like bodies, and then discharge the separated collars or bodies.

Another object of the invention is to provide in a machine of the character stated, novel means for rupturing the sleeve score lines and for simultaneously turning one or both edges of each collar or ring-like body to facilitate the subsequent turning of an edge curl, or to provide a flange at one or both ends of a ring-like body.

Another object of the invention is to provide a machine of the character stated wherein there are included a rotary turret having thereon a plurality of rupturing rolls adapted to receive scored sleeves thereover, stationary arcuate rupturing ribs against which the rolls press the sleeves in rolling contact for rupturing the sleeve score lines and separating each sleeve into its complement of collars or ring-like bodies, means for feeding the scored sleeves to the turret, and means for delivering the separated collars or ring-like bodies from the machine.

Another object of the invention is to provide a machine of the character stated in which the rupturing rolls are freely rotatably mounted on the rotary turret and include friction rings at their peripheries engageable internally of the scored sleeves to cause them to turn with the rolls while engaging in rolling surface contact with the rupturing ribs.

Another object of the invention is to provide a machine of the character stated wherein the rupturing rolls are reciprocable in the direction of their axes so as to be movable into the scored sleeves as they are presented by the sleeve feeding means prior to the rupturing of the score lines, and movable out of said sleeves after the separation of the collars or ring-like bodies by the rupturing of said score lines.

Another object of the invention is to provide a machine of the character stated in which the rupturing rolls are composed of oppositely reciprocable, axially aligned half sections adapted to move together to engage in the scored sleeves, and to move apart to clear the separated collars or ring-like bodies after the rupturing of the score lines.

Another object of the invention is to provide in a machine of the character stated means for so supporting the separated collars as they move away from the rupturing ribs as to cause them to spring outwardly out of contact with the peripheries of the rupturing rolls so as to clear them and avoid objectionable displacement of the collars by the rolls as they are moved apart and out of the separated collars.

Another object of the invention is to provide a machine of the character stated wherein there are provided crescent shaped spreaders movable endwise with the rupturing rolls for insertion in and retraction from the scored sleeves and which hold the sleeves in a moderately flattened or ovate form as they are being engaged in rolling surface contact with the rupturing ribs.

Another object of the invention is to provide a machine of the character stated in which the means for supporting the separated collars preparatory to the withdrawal of the rupturing rolls therefrom comprises novel pin means movable with the crescent shaped spreader means and also effective as the rupturing roll sections are moved apart and out of the separated collars to first release the centermost two collars so that they can fall away into means for delivering them from the machine, and then to release two collars, one at each side of and outwardly from the first released collars, and so on until all collars have been so released, two by two.

Another object of the invention is to provide novel means for delivering the separated collars or ring-like bodies from the machine individually, in processional order and with turned edges all facing in a like direction.

With the above and other objects in view that will hereinafter appear, the nature of the invention will be more clearly understood by reference to the following detailed description, the appended claims and the several views illustrated in the accompanying drawings.

In the drawings:

Figures 1 and 1A, when considered as connected at the matching lines A—A and B—B, together comprise a vertical longitudinal section of the machine taken on the line 1—1 on Figure 2.

Figure 2 is a vertical cross section taken on the line 2—2 on Figure 1.

Figure 3 is a fragmentary cross section taken on the line 3—3 on Figure 2.

Figure 4 is a fragmentary right side elevation illustrating the means by which the collars are fed to the main turret on which the collar separation is effected.

Figure 5 is a vertical cross section taken on the line 5—5 on Figure 4.

Figure 6 is a horizontal cross section taken on the line 6—6 on Figure 4.

Figure 7 is an enlarged fragmentary vertical cross section illustrating one rupturing roll unit in the course of engaging a collar sleeve in collar separating contact with the stationary, score line rupturing elements.

Figure 8 is a detail cross section taken on the line 8—8 on Figure 7.

Figure 9 is a detail cross section taken on the line 9—9 on Figure 7.

Figure 12 is an enlarged fragmentary vertical longitudinal section through one of the rupturing roll units in the course of engaging a collar sleeve in collar separating contact with the stationary, score line rupturing elements.

Figure 13 is an enlarged fragmentary detail longitudinal section illustrating a modified arrangement of the score line rupturing elements effective to turn one end edge of each collar inwardly coincidentally with the separation of the collar from the collar sleeve.

Figure 14 is a view similar to Figure 13 illustrating another modified arrangement of the score line rupturing elements effective to turn both end edges of each collar inwardly coincidentally with the separation of the collar from the collar sleeve.

Figure 15 is a side elevation illustrating a collar sleeve scored to provide four collars.

Figure 16 is an enlarged fragmentary cross section through one of the score lines on the line 16—16 on Figure 15.

Figure 17 is an enlarged right side elevation illustrating the chute into which the multiple collars are individually received after they are released from the rupturing roll units on which separation of the collars is effected.

Figure 18 is a plan view observed on the line 18—18 on Figure 17.

Figure 19 is a vertical cross section taken on the line 19—19 on Figure 17.

Figure 20 is a right side elevation illustrating the chute structure in which the multiple, separated collars are received side by side or in axial alignment, and in which they are deposited in single file, upstanding relation on a feed away belt.

Figure 21 is a fragmentary vertical cross section taken on the line 21—21 on Figure 20.

Figure 22 is a fragmentary vertical cross section taken on the line 22—22 on Figure 20.

Figure 23 is a fragmentary vertical cross section taken on the line 23—23 on Figure 20.

Figure 24 is a fragmentary end view observed on the line 24—24 on Figure 20.

Figure 25 is a fragmentary vertical cross section taken on the line 25—25 on Figure 20.

Figure 26 is a fragmentary vertical cross section taken on the line 26—26 on Figure 20.

Figure 27 is a fragmentary vertical cross section taken on the line 27—27 on Figure 20.

Figure 28 is a fragmentary vertical cross section taken on the line 28—28 on Figure 20.

Figure 10:
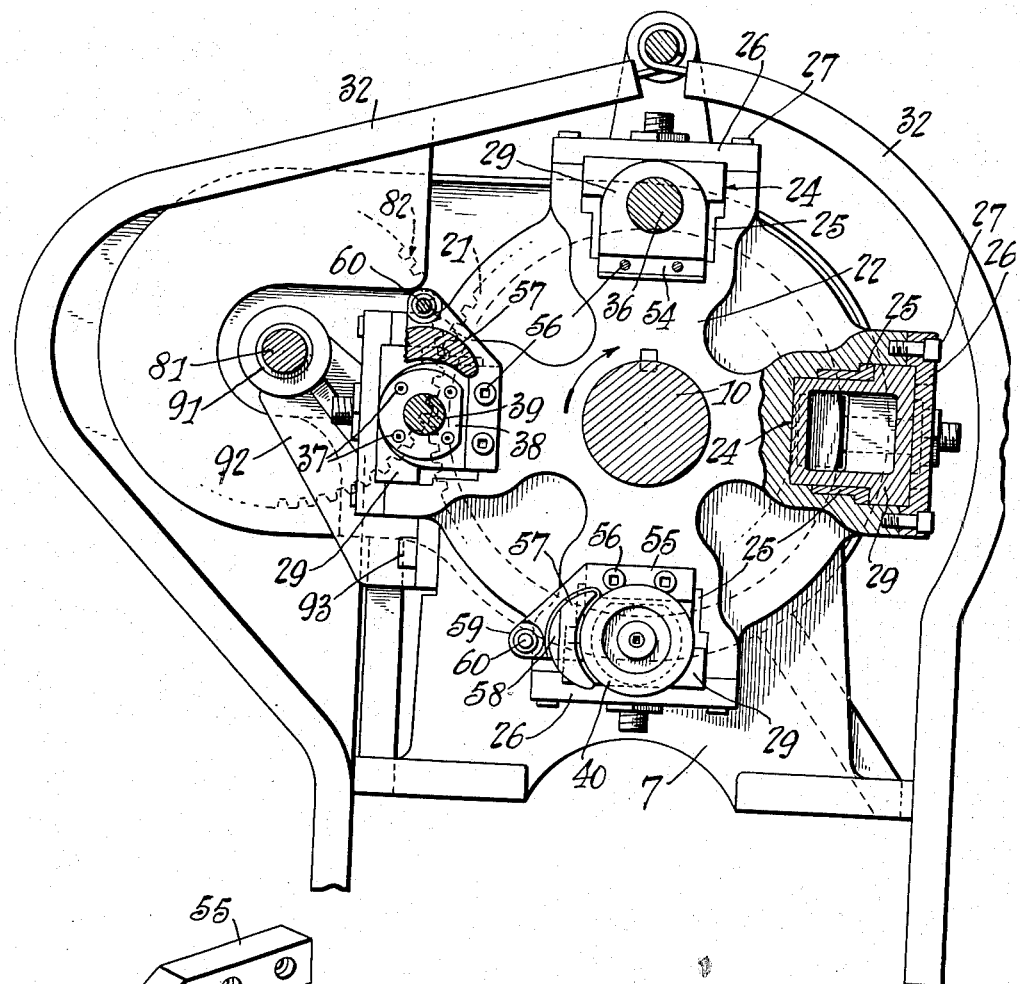
Figure 10 is an enlarged fragmentary vertical cross section illustrating the rupturing roll carrying turret, one roll unit and the associated collar spreading crescent being shown in elevation, one of the collar sleeve spreading crescents being shown in cross section, one roll supporting slide being shown in end elevation, and one said slide being shown in cross section.

In the example of embodiment of the invention herein disclosed, the illustrated machine includes a frame structure having a base 5 on which is mounted a body or bed 6. See Figures 1 and 1A. A bearing bracket 7 is mounted upon the bed at one end, and a bearing bracket 8 is mounted on said bed at its other end. The bracket 8 is equipped with a bearing hub 9 in which a turret shaft 10 is rotatably mounted, the same being extended through a drum cam 11 which is rigidly fixed to the bracket 8 as at 12 and is equipped with a cam groove 13 in its periphery which serves a purpose to be described hereinafter. The shaft 10 also has rotary bearing at 14 at its other end in a sleeve 15 extending from another drum cam 16 also equipped at its periphery with a cam groove 17 identical to the previously mentioned cam groove. The sleeve 15 is supported as at 18 in the bracket 7, being secured against rotation by key means 19 and held against movement endwise by threadably mounted abutment members 20 engaging at opposite sides of the bracket 7. A large spur gear 21 is secured on the end of the shaft 10 adjacent the bracket 7 and serves as a part of the means for driving the sleeve feeding devices in a manner to be described hereinafter.

Two rotors or spiders 22, identical in construction, are mounted on the shaft 10, one immediately inward of each of the cams 16 and 11 and each being key-secured on the shaft by key means 23 so as to be rotatable with the shaft and relative to the stationary cams. Each rotor or spider 22 is equipped with four equidistantly spaced, outwardly opening slideways 24 as will be best understood by reference to Figures 1, 1A and 10 of the drawings. Each slideway is flanked by bearing strips 25 and is closed by an outer closure plate 26 which is removably secured to the rotor by screws 27. It will be noted that each of the closure plates 26 is centrally and longitudinally slotted as at 28 at its outer end, and these slots serve a purpose which will soon become apparent. A slide 29 is longitudinally reciprocable in each slideway 24, each said slide being T-shaped as shown at the right in Figure 10 and having a roller 30 attached as at 31 to the outer end extremity so as to project radially-inwardly for engagement in the respective cam groove 13 or 17 as illustrated in Figures 1 and 1A. It will be apparent that as the rotors 22 rotate with the turret shaft 10 relative to the stationary cams 11 and 16, the slides will be caused to remain stationary during a portion of the rotation and move inwardly and outwardly during other portions of the rotation according to the shape of the cam grooves 13 and 17 and for a purpose to be described hereinafter. During longitudinal movement of the slides 29 the outward extensions of the roller supporting shanks 31 are movable in the closure slots 28.

Screen guards 32 extend over the rotors in the manner illustrated in Figures 1, 1A and 10, and said guards are pivotally supported as at 33 on support rods 34 extending inwardly from the frame supported brackets 7 and 8. The screens are spaced centrally in the manner indicated at 35 in Figure 1.

Each of the reciprocable slides 29 has an arbor 36 secured thereto in any approved manner, as by the passing of securing screws 37 through the arbor head or enlargement 38 into the inner end of the respective slide. Each arbor has a reduced inner end extension 39 whereon a mandrel or rupturing roll 40 is freely rotatably mounted on anti-friction bearings 41. It will also be apparent by reference to Figure 12 of the drawings that each arbor extension 39 is centrally recessed at 42 at its inner end extremity to receive a boss 43 projecting from a roll or mandrel securing head 44, one said head being equipped with a male extension 45 and the other of said heads being equipped with a female recess 46, said extensions and recesses engaging in cooperative centering relation in the manner illustrated in said Figure 12. The securing heads of each roll or mandrel set are removably secured to the respective arbor extensions 39 by screws 47, and the ends of the rolls 40 are recessed as at 48 to receive the heads. At the top center in the composite Figure 1—1A and in Figure 12, the half sections or component parts of one rupturing roll unit are shown in the operative position in which the ends of the sections abut, and at the lower central portion in the composite Figure 1—1A the component parts or sections of a mandrel or roll unit are shown in the inoperative or separated, collar releasing position.

The rolls 40 are peripherally grooved as at 49 to receive rubber or equivalent friction rings 50 which project slightly beyond the periphery of the rolls so as to be frictionally engageable with the interiors of collar sleeves. It will also be noted that each of the roll sections has at least one annular groove 51, that one roll section has end clearances 52 which serve to provide annular grooves when the sections are in abutting relation as shown in Figure 12, and that each said roll section has one or more rupturing rib opposing annuli 53. The purpose of the several recesses, grooves and annuli will be described in detail hereinafter.

Figure 11:
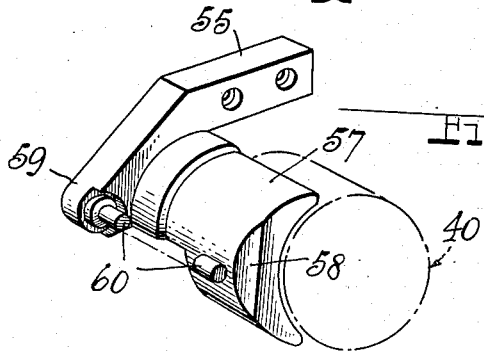
Figure 11 is a detail perspective view illustrating one of the collar sleeve spreading crescents and its supporting bracket.

Reference is made to Figures 10, 11 and 12 from which it will be apparent that the inner end of each arbor head 38 is slotted as at 54 to receive a rib extending from a bracket 55 which is secured to the head by screws 56, and each bracket carries a concavo-convex or crescent shaped spreader 57. It is to be noted that the concave face of each spreader is spaced slightly from and concentric to the periphery of one of the rupturing roll sections 40, and the inner end extremity of each spreader is bevelled as at 58 to facilitate entrance of the spreader into a collar sleeve as the roll sections are brought together from the separated condition illustrated at the bottom of the turret in Figure 1 to the abutting relation illustrated at the top of the turret in said figure and in Figure 12. Each bracket 55 also includes an extension 59 from which a pin 60 projects in spaced relation to and parallel the adjacent convex spreader surface. The pins 60 of the respective rupturing roll and spreader sets are axially aligned, and, of course, the cooperating endwise reciprocable spreaders 57 of each rupturing roll unit are accurately aligned.

A centrally placed frame structure generally designated 61 is supported as at 62 on the frame bed 6 and provides a pivotal support as at 63 for a stationary, arcuate support plate 64. See Figures 2, 3, 7 and 12. The free end of the plate 64 is removably secured by screws 65 on a cross bar 66 supported by the frame structure 61, and an arcuate anvil 67 is removably secured to the inner face of the plate 64, as by screws 68, and forms a backing for a plurality of individual arcuate plates 69 each having a rupturing and flange turning rib 70 extending inwardly at one edge thereof in the manner clearly illustrated in Figure 12. The arcuate plates 69 are recessed at their ends as at 71, and the arcuate anvil 67 is recessed at its ends as at 72 to receive anchor plates 73 which are removably secured as at 74 to the ends of the anvil 67. It will be apparent by reference to Figure 8 that the anchor plate means 73 at the upper or free end of the support plate 64 are individual plates, whereas the anchor plate means 73 at the lower or pivoted end of the plate 64 may comprise a single plate traversing all of the arcuate plates 69. Arcuate sleeve and guiding or confining plates 75 are secured as at 76 to the end faces of the anvil 67 in the manner clearly illustrated in Figures 1, 2, 7 and 12, and it will be apparent by reference to Figure 7 that the plates 75 are flared or bevelled as at 77 at their upper or receiving ends. The inner edges of the arcuate plates 75 extend inwardly of the arcuate plates 69 so as to form end guides for the scored collar sleeves as they are being moved along over the rupturing ribs by the rupturing rolls or mandrels in the manner clearly illustrated in Figures 7 and 12.

Circular guide plates 78 are adjustably secured as at 79 in parallel spaced relation on that portion of the turret shaft 10 between the rotors 22, the opposing faces of the plates being spaced apart the same distance as the arcuate guide plates 75 so as to receive scored collar sleeves therebetween. In order to facilitate mounting of the plates 78 they may be formed in half sections as shown in Figure 2.

The frame structure 61 provides bearings at 80 for a cross shaft 81 having a gear 82 secured thereon to which rotation is imparted by intermeshing contact with the turret shaft gear 21 in the manner indicated in dotted lines in Figure 10. It will be apparent by reference to Figures 2 through 6 that a transfer turret is secured on the shaft 81, said turret including parallel spaced plates 83 having arcuate peripheral pockets 84 which are opposed by an arcuate guide 85 supported as at 86 on the frame. It is to be understood that the transfer turret 83 is timed with the main turret and with the reciprocation of the rupturing roll sections so as to properly feed scored collar sleeves into position for being received over the rupturing roll and spreader sections 40 and 57 as they are brought together prior to the opposition of the rolls to the rupturing ribs.

It will be noted by reference to Figure 2 of the drawings that an arcuate stripper guide 87 is provided and supported as at 88 on the cross bar 66 in position for engaging the scored collar sleeves as they are conveyed about the guide 85 by the transfer turret pockets 84 so as to divert them from the arcuate path of movement of the transfer turret to the arcuate path of movement of the main turret. The guide 87 has a depressed end portion 89 leading to the rupturing ribs, and said depressed end portion is so aligned with the receiving end portions of the rupturing ribs as to smoothly guide the collar sleeves under said ribs to engage therewith without abrupt abutment. It is to be noted also that the depressed end portion 89 of the guide 87 is spaced from the delivery end 90 of the arcuate guide 85 a distance at least as great as the diameter of the collar sleeves.

The shaft 81 may also have bearing at 91 in a bracket 92 secured as at 93 on the previously mentioned bearing bracket 7, as shown in Figure 10.

The scored collar sleeves are designated 94 and are shown in the process of being fed into the main turret in dot and dash lines in Figure 2, and in detail in Figures 15 and 16. The sleeves are deeply scored at 95 at equidistantly spaced intervals to provide multiple collar widths 96, the scores extending circumferentially about the sleeves in parallel spaced relation as shown in Figure 15. The sleeves 94 are fed to the transfer turret pockets 84 by a feeding means generally designated 97.

The feeding means 97 best illustrated in Figures 2 through 6 includes parallel spaced frame plates 98 which may be pivotally supported at 99 on the frame structure 61 and have rest sockets 100 engageable over supports 101 projecting from said frame structure in the manner clearly illustrated in Figures 4 and 5, spacers 102 being provided for maintaining the proper spaced relation of the plates 98.

Parallel spaced guide plates 103 are laterally-adjustably supported as at 104 on the frame structure 61 and serve to confine the scored collar sleeves 94 against endwise movement as they are being fed into the machine by the feeding means.

A timing screw 105 is uprightly disposed and rotatable in bearings 106 provided in a supporting bracket 107 between the parallel frame plates 98, and a bevel gear 108 is secured to the upper end of the screw. The bevel gear 108 is driven by a bevel gear 109 secured on a cross shaft 110 which is rotatable in bearings 111 provided therefor in the frame plates 98, and a sprocket 112 secured on the cross shaft 110 is driven by a chain 113. The chain 113 passes over a driver sprocket 114 secured on a shaft 115 which is rotatable in a bracket 116 which is pivotally supported as at 117 at one end and adjustably supported as at 118 at its free end. A gear 119 secured on the bracket carried shaft 115 is driven by a meshing gear 120 secured on the transfer turret shaft 81, and it will be apparent that the bracket 116 is swingable about the axis of the shaft 81 and that adjustment thereof will serve to suitably tighten the timing screw driver chain 113.

Presser arms 121 oppose the timing screw 105 in the usual manner and are fixed on a shaft 122 which is rockably supported in bearings 123. The bearings 123 are adjustably supported at 124 on the support plates 98, and a weighted arm 125 constantly tends to move the arms 121 toward the screw 105 to the limit permitted by the adjustable stop means 126.

It will be apparent by reference to Figure 1A that a large gear 127 is secured on the turret shaft 10, and rotation is imparted to said gear through intermediate idler gears 128, by a driver gear 129 which is keyed on the power shaft 130 which is rotatable in frame bearings 131. A driver gear 132 may idle on the shaft 130 between a clutch hub 133 secured on said shaft and a brake drum 134 also secured on said shaft except when said gear 132 is not clutched to the driver shaft 130. The gear 132 has a clutch drum enlargement 135 which is engageable by a clutch band 136 which is expandable and contractible through the medium of the usual levers 137 engageable by the actuator 138. The actuator 138 is shiftable through the medium of a lever 139 which is pivoted intermediate its ends as at 140 on a frame bracket 141.

The bracket 141 also serves as a support for a fluid pressure cylinder 142, a control valve 143 and a valve operating solenoid 144, the solenoid and the valve being connected by actuator linkage generally designated 145. The piston rod 146 of the pressure cylinder is connected at 147 with the upper end of the lever 139, and said lever end also is connected through links 148 and 149 and a bell crank 150 with the actuating crank 151 of an actuator 152 for the brake band 153 encircling the drum 134. The parts 142 through 147 comprise portions of an optionally used automatic safety control system which forms no part of the present invention and which may take various forms, such as automatically discontinuing the operation of the machine whenever a jam occurs at the delivery end of the machine or upon dangerous leaving open of the guards 32. For example, suitable switch means actuated whenever the guards 32 are open may control the solenoid 144 to set the valve 143 for causing the cylinder means 142 to bring about a shifting of the lever 139 to disengage the clutch 136 and apply the brake 153. A similar safety switch actuation may result from a tripping of the safety lever 154 by jamming of collars at the delivery outlet.

A stripper arm 155 may be supported by the arcuate guide 85 in position for extending between the circular guide plates 78 of the main turret structure.

In Figures 13 and 14 of the drawings there are illustrated modified arrangements of the rupturing ribs. In Figure 13 the arcuate anvil 156 backs up separate or individual rupturing ribs 157 disposed intermediately of filler plates 158. Other than the formation of the rupturing ribs as separate elements, the assembly in Figure 13 may be the same and function the same as the arrangement shown in Figures 1 and 12.

In Figure 14 the rupturing ribs are separate elements and the sleeve engaging portions thereof are V-shaped. As in the arrangement shown in Figure 13, intermediate filler plates 160 are interposed between the rupturing ribs 159. The V-ribs oppose annular grooves 161 in the rupturing roll sections and an end recess 162 formed between the rupturing roll sections.

It will be apparent that in the arrangement shown in Figures 1, 12 and 13 the engagement of the scored sleeves with the rupturing ribs results simultaneously in a rupturing of the deep score lines effective to separate the sleeve into its complement of individual collars, and also to turn the edges of the collars at one end inwardly. If the inward turning of an edge is to be the mere start of a curl later to be formed on a collar end, the inward turning will be slight, but by varying the arrangement and depth of the rib opposing grooves the amount of turn can be accentuated so as to provide a flange of predetermined definite length and angularity. The arrangement shown in Figure 14 will be employed when it is desired to provide a curl start, or a flange, at each end of each collar. The individual collars formed by the rupturing of the score lines are indicated at 163 in Figure 12, and the inwardly turned curl or flange portions are indicated at 164. The individual collars are indicated at 165 in Figure 13 and the inwardly turned portions thereof are designated 166. In Figure 14, the individual collars are designated 167 and the inwardly turned portions at both ends of the collars are designated 168.

Assuming the machine to be in operation with the main turret rotating and the transfer turret 83 and the screw 105 rotating in proper timed relation thereto, scored collar sleeves 94 fed into the space between the guides 103 will be timed into the transfer turret pockets 84 by the screw 105 in the manner clearly illustrated in dot and dash lines in Figure 2. The peripheral grooves 13 and 17 in the cams are so shaped that they will hold the rupturing roll and spreader sections apart as illustrated at the lower portion of the main turret in Figure 1 while the sections are travelling from the low point position illustrated at the bottom in Figure 2 to the position illustrated at the left of the main turret shaft 10 as shown in said Figure 2. Thereafter, the cam grooves will cause the cooperating slides 29 to move toward each other and place the rupturing roll and spreader sections within the sleeve, the roll sections commencing their movement toward each other as the unit leaves the position shown in Figure 2 to the left of the turret shaft 10 and coming into end abutting relation shown at the top in Figure 1 and in Figure 12 before the conveyed collar sleeve engages the depressed guide end 89. As before stated the bevelling of the crescent shaped spreaders as at 58 facilitates the entrance of the spreaders into the sleeve, and it is to be understood that the axially aligned pins are movable with the rupturing roll sections and spreaders, and will be outside the sleeve in the manner clearly illustrated in Figure 7.

As a given rupturing roll set comes opposite the receiving ends of the rupturing rib carrying plates 69 the friction rings 50 will tightly engage the inner surface of the sleeve and press the same in rolling contact with the rupturing ribs while the crescent shaped spreaders 57 hold the engaging portions of the sleeve in somewhat flattened relation against the ribs in the manner illustrated in Figure 7.

By the time a given rupturing roll unit reaches the position illustrated at the extreme right in Figure 2 the rolling contact of the scored collar sleeve against the rupturing ribs 70 will have progressed throughout the complete circumference of the sleeve, and the rupturing of the score lines or the separation of the sleeve into individual collars will have been completed at least by the time the roll unit passes slightly beyond the position stated. As soon as a given rupturing roll unit clears the side guide plates 75, the cam grooves 17 and 13 function to move the slides 29 outwardly and retract the rupturing roll sections 40 and the spreaders 57 from the collars which are confined between the guide plates 75. As the separated collar complement of a collar sleeve moves clear of the rupturing ribs the advance portions of the collars will engage with the axially aligned pins 60 of the particular unit, and this contact will tend to align the separated collars and also cause the trailing portions thereof to spring clear of the roll section peripheries, thereby to avoid contact of bent edges or flanges on the collars with the roll peripheries such as would tend to turn the collars askew as the roll sections are withdrawn endwise therefrom. As the pins 60 move apart, they first clear the two centrally disposed separated collars, and then release the remaining collars, one at a time at each side and endwise of said first cleared collars.

The separated collars separated and releaesd in the manner described pass into individual channels between guide plates 169 which are properly spaced by fillers 170 and 171 supported with the plates on the framing 61. See Figures 2, 17 to 19. The collars also pass over floor pieces 172 whicn are pivotally supported at 173 and held by spring means 174 against adjustable stop screws or positioning abutments 175. It is to be noted by reference to Figure 18 that the delivery ends of the ways between the plates 169 are widened as at 176, as by flaring of the plates, and the delivery ends of the plates are bracketed, or split and offset, to provide receiving sockets 177 which are effective to embrace the ends 178 of individual parallel spaced plates 179 of a collar receiving and arranging means illustrated in detail in Figures 20 through 28 of the drawings. It will be apparent that by adjusting the postions of the stop screws or positioning abutments 175 the positions of the free ends of the pivotally mounted floor pieces 172 can be varied for varying the inclined position of the concaved upper surfaces of the floor pieces with relation to the arcuate path of the sleeves and separated collars while travelling with the turret and for causing said floor pieces to properly contribute toward accurate guiding of the separated collars onto the delivery chute structure floor fillers 171.

In the collar receiving and arranging means the individual plates 179 are held in properly spaced relation by the floors 180 so as to provide four individual receiving channels 181, 182, 183 and 184. The arranging chute structure, shown in detail in Figures 20 through 28, is generally designated 185 and may be attached by a bracket 186 to the framing 61.

It will be apparent by reference to Figures 20, 25 and 28 that the inclined upright guideway or channel 181 delivers against a deflector wall 187 which diverts one collar downwardly between the upright guideway defining guide walls 188 and side walls 189 into a confined, single collar width space or upright guide chamber 190 provided between the walls 191 where the collar is received uprightly on a conveyor belt 192. The belt travels over a floor 193 and passes about an idler pulley 194 and about and adjustably mounted driver pulley 195, the latter being driven by a sprocket and chain connection 196 from a suitable power source (not shown).

It will be apparent by reference to Figures 20 and 26 that the inclined upright guideway or channel 182 delivers against a reflector wall 197 which diverts a single collar downwardly between the upright guideway defining guide walls 198 and side walls 199 into the single width' collar receiving space or upright guide chamber 190 and onto the belt 192.

It will be apparent by referenc to Figures 20 and 27 that the inclined upright guideway or channel 183 delivers against a deflector wall 200 which diverts a single collar downwardly between the upright guideway defining guide walls 201 and side walls 202 into the single collar width space or upright guide chamber 190 and onto the belt 192. The upright guideway or channel 184 delivers against a deflector wall 203 which diverts the last collar of the sleeve complement of four downwardly between the upright guideway defining guide walls 204 into the single collar width space or upright guide chamber 190 and onto the belt 192. All of the collars are deposited on the belt 192 in upright relation, and when the edges of the individual collars are being turned inwardly at one edge only, all said edges will be directed to the same side. Thus by causing the belt 192 to deposit on a flat take-away conveyor and by providing suitable means for causing all of the collars to fall flatwise in the same direction onto the said last named conveyor, all necessity for rearrangement of the collars to properly place the turned edges will be eliminated.

The chute structure 185 may be adjustably supported as at 205 at its delivery end, and it is preferred that the same be provided with a hinged access door 206 as indicated in Figures 20 and 28.

While example forms of the invention have been shown for purposes of illustration, it is to be clearly understood that various changes in the details of construction and arrangement of parts may be made without departing from the spirit and scope of the invention as defined in the appended claims.

I claim:

1. In a machine for separating sleeves into multiple relatively narrow width collars or the like, sleeve separating means, means for feeding sleeves to the separating means, and means for delivering the separated collars in processional order from the machine, said last named means comprising, a travelling conveyor, means forming a guide chamber of only slightly greater width than a collar width extending upwardly from said conveyor, inclined floors and upright guide walls forming multiple individual inclined upright guideways of only slightly greater width than the collar width in which to receive the individual collars uprightly after they are separated and free to roll down the inclined floors, and means for guiding the individual collars in upright position from said guideways into the guide chamber and onto the conveyor at individual stations therealong.

2. Apparatus as defined in claim 1 in which the sleeve separating means includes a rotary turret for carrying the sleeves in an arcuate path as they are being separated and from which they are released while the turret is rotating after they are separated, and wherein the inclined upright guideway floors include pivotally mounted floor members having concaved surfaces on which to receive the separated collars, and means for varying the inclined relation of the concaved surfaces of said members with relation to the arcuate path the sleeves travel while moving with the rotary turret.

3. Apparatus as defined in claim 1 in which each upright guideway terminates in a deflector disposed to direct collars downwardly, and in which the means for guiding the collars from the guideways into the guide chamber and onto the conveyor comprises individual upright chutes in which the individual collars are received from the deflectors and which deliver the collars at individual points along the length of the conveyor.

4. Apparatus as defined in claim 1 in which each upright guideway terminates in a deflector disposed to direct collars downwardly, and in which the means for guiding the collars from the guideways into the guide chamber and onto the conveyor comprises individual upright chutes in which the individual collars are received from the deflectors and which deliver the collars at individual points along the length of the conveyor, one said upright guideway and chute and the guide chamber being disposed in a common vertical plane, and the remaining upright chutes being angled downwardly and laterally from the respective upright guideways into said guide chamber.

5. Apparatus as defined in claim 1 in which each upright guideway terminates in a deflector disposed to direct collars downwardly, and in which the means for guiding the collars from the guideways into the guide chamber and onto the conveyor comprises individual upright chutes in which the individual collars are received from the deflectors and which deliver the collars at individual points along the length of the conveyor, and there being included an access door in one wall of the guide chamber above the conveyor and extending along the same over a plurality of the upright chutes.

6. In a machine for separating sleeves having circumferential parallel score lines defining a multiple of collar widths, a rotor, means for rotating the rotor, a plurality of rupturing rolls spaced equidistantly about the rotor and freely rotatable about their axes on said rotor for engaging frictionally within sleeves to be separated, arcuate rupturing ribs supported in position for having sleeves pressed in rolling contact therewith by said rolls for causing the ribs to rupture the sleeve score lines and separate the sleeve into its complement of individual collars, and a crescent shaped spreader member having a convex outer surface sized to be readily receivable endwise in a sleeve to be separated and a concave inner surface concentric to and disposed close beside each rupturing roll to engage internally in a sleeve on the respective roll and cooperate with said respective roll in engagement in said sleeve to present a somewhat flattened or ovate surface portion of the sleeve to the rupturing ribs.

7. In a machine for separating sleeves having circumferential parallel score lines defining a multiple of collar widths, two rotors disposed in axially spaced relation and in axial alignment, slides mounted on each rotor for straight line reciprocation parallel the rotor axis and with each slide on one rotor aligned with a slide on the other rotor, axially aligned rupturing roll sections supported on the opposing and aligned ends of the slides, said roll sections being freely rotatable about their axes on said slides for engaging frictionally within sleeves to be separated, arcuate rupturing ribs supported in position for having sleeves pressed in rolling contact therewith by said rolls for causing the ribs to rupture the sleeve score lines and separate the sleeve into its complement of individual collars, means for presenting a sleeve between each cooperatively opposing set of roll sections as it is approaching the rupturing ribs, means for reciprocating the slides to cause the cooperatively opposing sets of roll sections to move together into end abutting relation within the presented sleeves then travel in the sleeves while they are being engaged in rolling contact with the ribs and then be separated and retracted from the sleeves to free the rupturing rib separated individual collars, and means movable with each set of axially aligned rupturing roll sections as they come into end abutting relation for accurately aligning and mutually supporting the roll sections against radial deflection.

8. In a machine for separating sleeves having circumferential parallel score lines defining a multiple of collar widths, a rotor, means for rotating the rotor, a plurality of rupturing rolls spaced equidistantly about the rotor and being of like diameter much smaller than the internal diameter of said sleeves and freely rotatable about their axes on said rotor for engaging frictionally within the sleeves to be separated, arcuate rupturing ribs stationarily supported in generally concentric relation to the rotor axis and extending thereabout a distance greater than the circumference of one of said sleeves and in position for having sleeves pressed in rolling contact therewith by said rolls for causing the ribs to rupture the sleeve score lines and separate the sleeve into its complement of individual collars, means for moving the rupturing rolls in the direction of their axes for presenting them in sleeves to be pressed in score line rupturing contact with the rupturing ribs and for retracting them after the rupturing of the sleeves, and means disposed to engage between the collars after the score lines are ruptured to hold the collars in separated paths of travel.

9. In a machine for separating sleeves having circumferential parallel score lines defining a multiple of collar widths, a rotor disposed to rotate about a horizontal axis, means for rotating the rotor, a plurality of rupturing rolls spaced equidistantly about the rotor and being of like diameter much smaller than the internal diameter of said sleeves and freely rotatable about their axes on said rotor for engaging frictionally within the sleeves to be separated, arcuate rupturing ribs stationarily supported in generally concentric relation to the rotor axis and extending thereabout a distance greater than the circumference of one of said sleeves, and means for bringing about relative movement between the rupturing rolls and scored sleeves in the direction of their axes to present such sleeves and rolls in position for having the rolls press the sleeves in rolling contact with the rupturing ribs to rupture the sleeve score lines and separate each sleeve into its complement of individual collars.

10. Machine structure as defined in claim 8 in which there are included at the peripheries of the rolls yieldable friction rings engageable with the interiors of the sleeves to cause the sleeves to rotate with the rolls in rolling contact against the rupturing ribs, and said rolls also having therein annular recesses opposing the rupturing ribs and into which said ribs turn edge portions of the collars simultaneously with the separation thereof, and said collar separation holding means being disposed adjacent the ribs so as to come into function before effective engagement of the rolls with the collars is terminated.

11. Machine structure as defined in claim 8 in which there are included at the peripheries of the rolls yieldable friction rings engageable with the interiors of the sleeves to cause the sleeves to rotate with the rolls in rolling contact against the rupturing ribs, and said rolls also having therein annular recesses opposing the rupturing ribs and into which said ribs turn edge portions of the collars simultaneously with the separation thereof, and in which there is included a crescent shaped spreader member having a convex outer surface sized to be readily receivable endwise in a sleeve to be separated and a concave inner surface concentric to and disposed close beside each rupturing roll to engage internally in a sleeve on the respective roll and cooperate with said respective roll in engagement in said sleeve to present a somewhat flattened or ovate surface portion of the sleeve to the rupturing ribs, and the collar separation holding means is disposed adjacent the ribs so as to come into function before effective engagement of said friction rings with the interiors of the collars is terminated.

12. In a machine for separating sleeves having circumferential parallel score lines defining a multiple of collar widths, a rotor, means for rotating the rotor, a plurality of rupturing rolls spaced equidistantly about the rotor and being of like diameter much smaller than the internal diameter of said sleeves and freely rotatable about their axes on said rotor for engaging frictionally within the sleeves to be separated, arcuate rupturing ribs stationarily supported in generally concentric relation to the rotor axis and extending thereabout a distance greater than the circumference of one of said sleeves and in position for having sleeves pressed in rolling contact therewith by said rolls for causing the ribs to rupture the sleeve score lines and separate the sleeve into its complement of individual collars, slides mounted on said rotor for straight line reciprocation parallel to the rotor axis and supporting said rolls, means for presenting a sleeve opposite each roll as it is approaching the rupturing ribs, means for reciprocating the slides to cause the rolls to enter the presented sleeves then travel in the sleeves while they are being engaged in rolling contact with the ribs and then be retracted from the sleeves, and means disposed to engage between the collars after the score lines are ruptured to hold the collars in separate paths of travel.

13. Machine structure as defined in claim 12 in which there are included at the peripheries of the rolls yieldable friction rings engageable with the interiors of the sleeves to cause the sleeves to rotate with the rolls in rolling contact against the rupturing ribs, and said rolls also having therein annular recesses opposing the rupturing ribs and into which said ribs turn edge portions of the collars simultaneously with the separation thereof, and the collar separation holding means are disposed adjacent the ribs so as to come into function before effective engagement of said friction rings with the interiors of the collars is terminated.

14. Machine structure as defined in claim 12 in which there is included a crescent shaped spreader mounted on and movable with each slide and roll having a convex outer surface sized to be readily receivable endwise in a sleeve to be separated and a concave inner surface concentric to and disposed close beside the respective roll to engage internally in a sleeve on the respective roll and cooperate with said respective roll in engagement in said sleeve to present a somewhat flattened or ovate surface portion of the sleeve to the rupturing ribs, and the collar separation holding means is disposed adjacent the ribs so as to come into function before effective engagement of said friction rings with the interiors of the collars is terminated.

15. Machine structure as defined in claim 12 in which there are included at the peripheries of the rolls yieldable friction rings engageable with the interiors of the sleeves to cause the sleeves to rotate with the rolls in rolling contact against the rupturing ribs, and said rolls also having therein annular recesses opposing the rupturing ribs and into which said ribs turn edge portions of the collars simultaneously with the separation thereof, and in which there is included a crescent shaped spreader mounted on and movable with each slide and roll having a convex outer surface sized to be readily receivable endwise in a sleeve to be separated and a concave inner surface concentric to and disposed close beside the respective roll to engage internally in a sleeve on the respective roll and cooperate with said respective roll in engagement in said sleeve to present a somewhat flattened or ovate surface portion of the sleeve to the rupturing ribs, and the collar separation holding means is disposed adjacent the ribs so as to come into function before effective engagement of said friction rings with the interiors of the collars is terminated.

16. Machine structure as defined in claim 12 in which there is included a crescent shaped spreader mounted on and movable with each slide and roll having a convex outer surface sized to be readily receivable endwise in a sleeve to be separated and a concave inner surface concentric to and disposed close beside the respective roll to engage internally in a sleeve on the respective roll and cooperate with said respective roll in engagement in said sleeve to present a somewhat flattened or ovate surface portion of the sleeve to the rupturing ribs, and means engageable by the separated collars of each sleeve as they move out of contact with the rupturing ribs for aligning said collars and causing them to spring away from their contacts with peripheral portions of the rolls therein prior to retraction of the rolls from the collars.

17. Machine structure as defined in claim 12 in which there is included a crescent shaped spreader mounted on and movable with each slide and roll having a convex outer surface sized to be readily receivable endwise in a sleeve to be separated and a concave inner surface concentric to and disposed close beside the respective roll to engage internally in a sleeve on the respective roll and cooperate with said respective roll in engagement in said sleeve to present a somewhat flattened or ovate surface portion of the sleeve to the rupturing ribs and in which the sleeve presenting means includes a peripherally pocketed transfer turret rotating in timed relation to the rotor opposite a stationary arcuate sleeve guide, and there being included pin means carried by and movable with the spreaders spaced from and in advance of said spreaders with their axes paralleling the axes of the rolls and being engageable by the separated collars of each sleeve as they move out of contact with the rupturing ribs for aligning said collars and causing them to spring away from their contacts with peripheral portions of the rolls therein prior to retraction of the rolls from the collars.

18. Machine structure as defined in claim 8 in which there is included a crescent shaped spreader member having a convex outer surface sized to be readily receivable endwise in a sleeve to be separated and a concave inner surface concentric to and disposed close beside each rupturing roll to engage internally in a sleeve on the respective roll and cooperate with said respective roll in engagement in said sleeve to present a somewhat flattened or ovate surface portion of the sleeve to the rupturing ribs, there being included also a pin spaced adjacent and in advance of each spreader and paralleling the respective roll axis in position for being engaged by the separated collars of each sleeve as they move out of contact with the rupturing ribs for aligning said collars and causing them to spring away from their contacts with peripheral portions of the rolls therein prior to retraction of the rolls from the collars.

19. Machine structure as defined in claim 12 in which there is included a crescent shaped spreader mounted on and movable with each slide and roll having a convex outer surface sized to be readily receivable endwise in a sleeve to be separated and a concave inner surface concentric to and disposed close beside the respective roll to engage internally in a sleeve on the respective roll and cooperate with said respective roll in engagement in said sleeve to present a somewhat flattened or ovate surface portion of the sleeve to the rupturing ribs, there being included also a pin spaced adjacent and in advance of each spreader and paralleling the respective roll axis in position for being engaged by the separated collars of each sleeve as they move out of contact with the rupturing ribs for aligning said collars and causing them to spring away from their contacts with peripheral portions of the rolls therein prior to retraction of the rolls from the collars.

20. In a machine for separating sleeves having circumferential parallel score lines defining a multiple of collar widths, a rotor, means for rotating the rotor, a plurality of rupturing rolls spaced equidistantly about the rotor and being of like diameter much smaller than the internal diameter of said sleeves and freely rotatable about their axes on said rotor for engaging frictionally within the sleeves to be separated, arcuate rupturing ribs stationarily supported in generally concentric relation to the rotor axis and extending thereabout a distance greater than the circumference of one of said sleeves, and means for bringing about relative movement between the rupturing rolls and scored sleeves in the direction of their axes to present such sleeves and rolls in position for having the rolls press the sleeves in rolling contact with the rupturing ribs to rupture the sleeve score lines and separate each sleeve into its complement of individual collars and spaced guide plates between which the ends of the sleeves are confined as they are moving about with and being separated by the rolls in contact with the rupturing ribs.

21. In a machine for separating sleeves having circumferential parallel score lines defining a multiple of collar widths, two rotors disposed in axially spaced relation and in axial alignment, slides mounted on each rotor in equidistantly spaced relation about the rotor axis and for straight line reciprocation parallel the rotor axis and with each slide on one rotor aligned with a slide on the other rotor, axially aligned rupturing roll sections supported on the opposing and aligned ends of the slides, said roll sections being of like diameter much smaller than the internal diameter of said sleeves and freely rotatable about their axes on said slides for engaging frictionally within the sleeves to be separated, arcuate rupturing ribs stationarily supported in generally concentric relation to the rotor axis and extending thereabout a distance greater than the circumference of one of said sleeves and in position for having sleeves pressed in rolling contact therewith by said rolls for causing the ribs to rupture the sleeve score lines and separate each sleeve into its complements of individual collars, means for presenting a sleeve between each cooperatively opposing set of roll sections as it is approaching the rupturing ribs, means for reciprocating the slides to cause the cooperatively opposing sets of roll sections to move together into end abutting relation within the presented sleeves then travel in the sleeves while they are being engaged in rolling contact with the ribs and then be separated and retracted from the sleeves to free the rupturing rib separated individual collars, and means disposed to engage between the collars after the score lines are ruptured to hold the collars in separate paths of travel.

22. Machine structure as defined in claim 21 in which each slide carries a crescent shaped spreader member having a convex outer surface sized to be readily receivable endwise in a sleeve to be separated and a concave inner surface concentric to and disposed close beside the respective rupturing roll section to engage internally in a sleeve within which opposing roll sections abut and cooperate with said respective roll in engagement in said sleeve to present a somewhat flattened or ovate surface portion of the sleeve to the rupturing ribs.

23. Machine structure as defined in claim 21 in which each slide carries a crescent shaped spreader member having a convex outer surface sized to be readily receivable endwise in a sleeve to be separated and a concave inner surface concentric to and disposed close beside the respective rupturing roll section to engage internally in a sleeve within which opposing roll sections abut and cooperate with said respective roll in engagement in said sleeve to present a somewhat flattened or ovate surface portion of the sleeve to the rupturing ribs, and in which there is included means engageable by the separated collars of each sleeve as they move out of contact with the rupturing ribs for aligning said collars and causing them to spring away from their contacts with peripheral portions of the rolls therein prior to retraction of the roll sections endwise from the collars.

24. Machine structure as defined in claim 21 in which each slide carries a crescent shaped spreader member having a convex outer surface sized to be readily receivable endwise in a sleeve to be separated and a concave inner surface concentric to and disposed close beside the respective rupturing roll section to engage internally in a sleeve within which opposing roll sections abut and cooperate with said respective roll in engagement in said sleeve to present a somewhat flattened or ovate surface portion of the sleeve to the rupturing ribs, and in which there are included axially aligned pins one carried by and movable with each slide and engageable by the separated collars of each sleeve as they move out of contact with the rupturing ribs for aligning said collars and causing them to spring away from their contacts with peripheral portions of the rolls therein prior to retraction of the roll sections endwise from the collars.

25. Machine structure as defined in claim 21 in which each slide carries a crescent shaped spreader member having a convex outer surface sized to be readily receivable endwise in a sleeve to be separated and a concave inner surface concentric to and disposed close beside the respective rupturing roll section to engage internally in a sleeve within which opposing roll sections abut and cooperate with said respective roll in engagement in said sleeve to present a somewhat flattened or ovate surface portion of the sleeve to the rupturing ribs, and in which the sleeve presenting means includes a peripherally pocketed transfer turret rotating in timed relation to the rotor opposite a stationary arcuate sleeve guide, and there being included also a stationary guide track portion so disposed with relation to the receiving end portions of the rupturing ribs as to smoothly guide the collar sleeves under the ribs without abrupt abutment.

26. Machine structure as defined in claim 21 in which there is provided a collar supporting pin mounted on and movable with each slide with the pins of cooperating slides axially aligned and spaced adjacent and in advance of and paralleling the respective roll section axes in position for travelling in advance of said roll section axes and for supporting the collars as the roll sections move away from the rupturing ribs and releasing them as the roll sections are moved apart, first two collars at the center and then one at each side endwise from the center.

References Cited in the file of this patent

UNITED STATES PATENTS

| Number | Name | Date |
|---|---|---|
| 517,580 | Livingston | Apr. 3, 1894 |
| 586,661 | Holden | July 20, 1897 |
| 923,552 | Mill | June 1, 1909 |
| 923,554 | Mill | June 1, 1909 |
| 1,008,784 | Cahill | Nov. 14, 1911 |
| 1,085,946 | Seeley | Feb. 3, 1914 |
| 1,278,941 | Kruse | Sept. 17, 1918 |
| 1,345,458 | Pierce | July 6, 1920 |
| 1,590,334 | Tevander | June 29, 1926 |
| 1,609,986 | Brenzinger | Dec. 7, 1926 |
| 1,753,827 | Glasser | Apr. 8, 1930 |
| 1,941,046 | Prahl | Dec. 26, 1933 |
| 1,952,857 | Grotnes | Mar. 27, 1934 |
| 2,053,375 | Nicholas | Sept. 8, 1936 |
| 2,081,042 | Krueger | May 18, 1937 |
| 2,109,921 | Leach | Mar. 1, 1938 |
| 2,222,842 | Humphrey | Nov. 26, 1940 |
| 2,407,776 | Gladfelter | Sept. 17, 1946 |
| 2,621,622 | Henchert | Dec. 16, 1952 |

FOREIGN PATENTS

| Number | Country | Date |
|---|---|---|
| 11,836 | Great Britain | of 1897 |